United States Patent Office 2,875,228
Patented Feb. 24, 1959

2,875,228
ESTERS OF THIOLCARBOXYLIC ACIDS

Gail H. Birum, Dayton, Ohio, assignor to Monsanto Chemical Company, St. Louis, Mo., a corporation of Delaware No Drawing. Application December 30, 1955
Serial No. 556,437

14 Claims. (Cl. 260—455)

This invention relates to phosphono-substituted esters of thiol-carboxylic acids and to a method of producing the same.

The preparation of the present esters may be illustrated by the following equation:

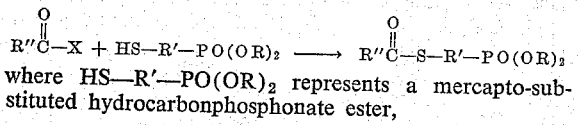

where HS—R'—PO(OR)$_2$ represents a mercapto-substituted hydrocarbonphosphonate ester,

represents the radical obtained by removal of the OH radical from an organic carboxylic acid, and X taken separately represents halogen, while X taken together with the

radical represents a carboxylic acid anhydride, i. e.,

represents an organic carboxylic acid halide or anhydride.

Mercapto-substituted hydrocarbonphosphonate esters particularly preferred in the present process are of the formula HS—R'—PO(OR)$_2$, where R' represents a hydrocarbon radical of from one to ten carbon atoms and free of non-benzenoid unsaturation, separating the phosphorus and sulfur atoms by from one to five aliphatic carbon atoms, and R is selected from the class consisting of lower-alkyl and haloalkyl radicals. By non-benzenoid unsaturation is here meant carbon-to-carbon, olefinic or acetylenic unsaturation. Mercapto hydrocarbonphosphonate esters of this structure and useful in the preparation of the present novel compounds may be prepared, e. g., by the catalytic reaction of keto phosphonic acid esters with hydrogen sulfide and hydrogen, as described, for example, in my copending application, Serial No. 556,436, of even date and common assignment herewith.

As examples of presently useful mercapto-hydrocarbonphosphonate esters may be listed, e. g., lower-alkyl and haloalkyl esters of mercaptoalkylphosphonic acids such as diethyl 2-mercaptoethylphosphonate, diisopropyl 2-mercaptoethylphosphonate, di-t-butyl 2-mercaptoethylphosphonate, bis(2-chloroethyl) 2-mercaptoethylphosphonate, ethyl methyl 3-mercaptopropylphosphonate, di-n-propyl 2-mercapto-2-methylpropylphosphonate, diethyl 3-mercaptobutylphosphonate, dimethyl 2-(mercaptomethyl)butylphosphonate, diethyl 2-mercapto-2,4,4-trimethylpentylphosphonate, diethyl 2-ethyl-4-mercaptohexylphosphonate, dimethyl 5-mercaptodecylphosphonate, etc. Presently useful mercaptoaralkylphosphonates include, e. g., diethyl 1-phenyl-2-mercaptoethylphosphonate, diethyl 2-phenyl-2-mercaptoethylphosphonate, amyl isopropyl 2-p-tolyl-2-mercaptoethylphosphonate, bis(3-chloropropyl) 2-phenyl-2-mercaptoethylphosphonate, diethyl 2-mercapto-2-(2,4-xylyl)ethylphosphonate, dimethyl 2-mercapto-2-(p-ethylphenyl)ethylphosphonate, diethyl 3-mercapto-2-phenylpropylphosphonate, dimethyl 2-mercapto-2-o-tolylpropylphosphonate, diethyl 3-mercapto-4-phenylbutylphosphonate, dimethyl 2-cyclohexyl-3-mercaptopropylphosphonate, etc.

Particularly readily available and useful in the present process are esters of α-mercapto-hydrocarbonphosphonic acids of the above formula, e. g., 1-mercaptoalkylphosphonates such as dimethyl mercaptomethylphosphonate, diethyl mercaptomethylphosphonate, diisobutyl mercaptomethylphosphonate, diethyl 1-mercaptoethylphosphonate, ethyl methyl 1-mercaptoethylphosphonate, bis(2-chloroethyl) 1-mercaptoethylphosphonate, di-n-propyl 1-mercaptoisooctylphosphonate, diamyl 1-mercaptobutylphosphonate, diethyl 1-mercaptopropylphosphonate, diethyl 1-mercapto-2,2-dimethylpropylphosphonate, etc.; and α-mercaptoaralkylphosphonates, such as diethyl α-mercaptobenzylphosphonate, dimethyl α-mercaptobenzylphosphonate, diisobutyl α-mercapto-p-methylbenzylphosphonate, diisopropyl α-mercapto-o-ethylbenzylphosphonate, diethyl α-mercaptocuminylphosphonate; as well as α-mercapto(cycloalkyl)alkylphosphonates such as diethyl (cyclohexyl)(mercapto)methylphosphonate.

Any of a wide diversity of organic carboxylic acid halides or anhydrides may be condensed with mercaptohydrocarbonphosphonic acid esters in accordance with the present process to produce the novel phosphono-substituted esters of thiolcarboxylic acids provided by this invention. For the purposes of the present specification and claims, by "organic carboxylic acid" is meant those acids free of heterocyclic radicals in which a hydrocarbon skeleton, i. e., a carbon atom chain, terminates in a carbon atom attached to the carbonyl group of the acid function; the hydrocarbon skeleton, i. e., carbon atom chain, may include carbocyclic radicals and the carbon atoms may be substituted entirely by hydrogen atoms or substituted in whole or in part by other functional groups. Thus, for example, aryl, alkaryl, arylalkyl, cycloalkyl, alkenyl and alkyl carboxylic acid halides and anhydrides containing, e. g., from one to twenty carbon atoms, and the corresponding halides or anhydrides substituted in the radical attached to the acid carbonyl carbon atom by any of a great variety of substituents, such as halo, nitro, alkoxy, aroxy, etc., are all useful in producing the present esters. As examples of hydrocarbon carboxylic acid halides and anhydrides which may be condensed with mercapto hydrocarbonphosphonic acid esters to produce phosphono-substituted esters of thiolcarboxylic acids may be listed, e. g., alkylcarboxylic acid derivatives such as acetyl chloride, acetic anhydride, propionyl chloride, butyryl chloride, valeryl chloride, enanthyl chloride, pelargonyl chloride, lauroyl chloride, myristoyl chloride, palmitoyl chloride, stearoyl chloride, α-methylbutyryl chloride, isovaleryl chloride, etc. Typical examples of acid halides and anhydrides which are presently useful and wherein the organic radical attached to the acid carbonyl atom is an aryl radical are, e. g., benzoyl chloride, benzoic anhydride, p-toluyl chloride, 2,4-dimethylbenzoyl chloride, cumoyl chloride, phthalic anhydride, homophthalic anhydride, etc. Examples of presently useful aralkyl and cycloalkyl carboxylic acid halides and anhydrides are, e. g., phenylacetyl chloride, hydrocinnamoyl chloride, γ-phenylbutyryl chloride, o-phenylenediacetic anhydride, cyclohexanecarboxylic anhydride, cyclopentanepropionyl chloride, etc. Examples of presently useful alkenyl acid halides are, e. g., acrylyl chloride, methacrylyl chloride, crotonyl chloride, isocrotonyl chloride, 3-butenoyl chloride, hydrosorbyl chloride, sorbyl chloride, 6-heptenoyl chloride, propiolyl chloride, etc.

Typical examples of acid halides and anhydrides wherein the organic radical attached to the acid carbonyl carbon atom carries substituents which are non-interfering in the present reaction are, e. g., p-chlorobenzoyl chloride, p-(chloroformyl)benzoic acid, ethyl p-(chloroformyl)benzoate, 2,4-dichlorobenzoyl chloride, bis(2,4-dichlorobenzoic) anhydride, p-formylbenzoyl chloride, 2-nitro-5-methylbenzoyl chloride, m-bromobenzoyl bromide, m-nitrobenzoyl chloride, 3,5-dinitrobenzoyl chloride, p-ethoxybenzoyl chloride, p-phenoxybenzoyl chloride, o-chloro-p-toluyl chloride, p-chlorophenylacetyl chloride, bis-(p-chlorophenylacetic) anhydride, 3-(o-nitrophenyl)propionyl chloride, cyclohexaneacetyl chloride, chloroacrylyl chloride, bis(chloroacrylic) anhydride, bis(chloroacetic) anhydride, bis(methoxyacetic)anhydride, 5-carbomethoxyvaleryl chloride, phenoxyacetyl chloride, 2,4-dichlorophenoxyacetyl chloride, phenoxybutyryl chloride, etc.

The products of the present reaction are phosphono-substituted hydrocarbon esters of organic thiolcarboxylic acids. Thus, e. g., by the reaction of diethyl 1-mercaptoethylphosphonate with benzoyl chloride or benzoic anhydride, there is obtained 1-(diethoxyphosphinyl)ethyl thiolbenzoate. Similarly, by the reaction of bis(2-chloroethyl) 2-mercaptoethylphosphonate with p-chlorobenzoyl chloride, there is obtained 2-[bis(2-chloroethoxy)phosphinyl]ethyl p-chlorothiolbenzoate. As examples of other of the novel products of this invention may be listed, e. g., the products of the reaction of mercaptoalkyl- and -aralkylphosphonates with alkyl carboxylic acids or anhydrides, such as 1-(dimethoxyphosphinyl)ethyl thiolacetate, 1-(diethoxyphosphinyl)ethyl thiolacetate, 1-[bis-(2-chloroethoxy)phosphinyl]ethyl thiolacetate, 1-(diethoxyphosphinyl)-2-propyl thiolpropionate, (dimethoxyphosphinyl)methyl thiolbutyrate, 2-(diethoxyphosphinyl)ethyl thiollaurate, 2-(dimethoxyphosphinyl)ethyl thiolmyristate, 2-(diisopropoxyphosphinyl)ethyl thiolpalmitate, 2-(di-t-butoxyphosphinyl)ethyl thiolstearate, 3-(diethoxyphosphinyl)-2-methylbutyl thioisobutyrate, 2-[bis(2-chloroethoxy)phosphinyl]-1-phenylethyl thiolbutyrate, 1-(diisobutoxyphosphinyl)-2-phenylpropyl thiolacetate, 1-(diethoxyphosphinyl)-2-p-tolylethyl thiolacetate, α-(dibutoxyphosphinyl)benzyl thiolacetate, α-(diamoxyphosphinyl)-p-ethylbenzyl thiolpropionate, α-(diethoxyphosphinyl)cuminyl thiolacetate, 1-(dimethoxyphosphinyl)-4-phenylbutyl thiolacetate, etc.

Presently provided esters derived by reaction of a mercaptoalkylphosphonate ester with a substituted alkanoic acid are, e. g., 1-(diethoxyphosphinyl)ethyl cyanothiolacetate, 2-[bis(2-chloroethoxy)phosphinyl]ethyl chlorothiolacetate, (dimethoxyphosphinyl)methyl methoxythiolacetate, etc.

Alkenyl carboxylic acid halides and anhydrides reacted with di-lower-alkyl and haloalkyl mercaptohydrocarbonphosphonates provide, e. g., (dimethoxyphosphinyl)methyl thiolacrylate, 1-(diethoxyphosphinyl)ethyl thiolacrylate, 3-[(isobutoxy)(methoxy)phosphinyl]propyl thiolmethacrylate, 4-[bis(2-bromoethoxy)phosphinyl]butyl thiolcrotonate, 2-(diethoxyphosphinyl)-1-phenylethyl thiolbenzoate, [bis(2-chloroethoxy)phosphinyl]methyl thiolbenzoate, dimethoxyphosphinylmethyl thiolbenzoate, 1-(diisopropoxyphosphinyl)-2-(2,4-xylyl)ethyl thiol-2-butenoate, 1-(diethoxyphosphinyl)-4-phenylbutyl thiolcrotonate, 1-(diethoxyphosphinyl)-2,2-dimethylpropyl thiolacrylate, 4-(diethoxyphosphinyl)isodecyl thioisocrotonate, 1-(dimethoxyphosphinyl)-2-ethylhexyl thiolhydrosorbate, α-(diethoxyphosphinyl)benzyl thiolacrylate, α-(diamoxyphosphinyl)cuminyl thiolmethacrylate, (diethoxyphosphinyl)(cyclohexyl)methyl thiolmethacrylate, etc. Alkenyl acid halides and anhydrides carrying other substituents provide, e. g., 3-[bis(2-chloropropoxy)phosphinyl]propyl 3-chlorothiolacrylate, 1-(diethoxyphosphinyl)ethyl 4-nitrothiolcrotonate, (diethoxyphosphinyl)methyl 3-methoxy thiolacrylate, 2-(diisopropoxyphosphinyl)-1-phenylethyl 3-cyanothiolacrylate, 3-(diethoxyphosphinyl)propyl 3-bromomethacrylate, 1-(diisopropoxyphosphinyl)ethyl 4-phenoxythiolcrotonate, etc.

Another class of novel thiolcarboxylic acid esters provided by the present invention are products of the reaction of di-lower-alkyl and haloalkyl mercaptohydrocarbonphosphonates with aryl and alkaryl carboxylic acid halides and anhydrides, e. g., 1-(dimethoxyphosphinyl)ethyl thiolbenzoate, 3-(diethoxyphosphinyl)propyl thiolbenzoate, [bis(2-chloroethoxy)phosphinyl]methyl thiolbenzoate, (dimethoxyphosphinyl)methyl thiolbenzoate, 2-(diethoxyphosphinyl)-1-phenylethyl thiolbenzoate, α-(diethoxyphosphinyl)benzyl thiolbenzoate, 1-(diethoxyphosphinyl)ethyl p-thioltoluate, 3-(di-n-propoxyphosphinyl)-2-ethylhexyl o-thioltoluate, (ethoxymethoxyphosphinyl)methyl 2,4-dimethylthiolbenzoate, 1-(diethoxyphosphinyl)-2-phenylethyl 3,5-dimethylthiolbenzoate, α-(diethoxyphosphinyl)benzyl p-isopropylthiolbenzoate, 1-(diethoxyphosphinyl)ethyl p-thiolbiphenylylcarboxylate, etc. Substituted aryl carboxylic acids give, e. g., (dimethoxyphosphinyl)methyl p-chlorothiolbenzoate, 1-[(ethoxy)(methoxy)phosphinyl]ethyl p-sulfamoylthiolbenzoate, α-(diethoxyphosphinyl)benzyl 2-chloro-3-nitrothiolbenzoate, 1-(dimethoxyphosphinyl)-2-(p-ethylphenyl)ethyl 2-nitro-5-methylthiolbenzoate, S-[1-(di-t-butoxyphosphinyl) ethyl] O-hydrogen monothiolphthalate, (dimethoxyphosphinyl)methyl p-acetylthiolbenzoate, α-(diethoxyphosphinyl)benzyl thiolanisate, etc. As illustrative of the products of the reaction of cycloalkyl, aralkyl, and alkenyl carboxylic halides and anhydrides with di-lower-alkyl and haloalkyl mercaptoalkylphosphonates may be listed, e. g., 1-(diethoxyphosphinyl)ethyl thiolcyclohexanecarboxylate, 1-[bis(2-chloroethoxy)phosphinyl]ethyl thiolcyclohexaneacrylate, (diethoxyphosphinyl)methyl phenyltiolacetate, 1-(dimethoxyphosphinyl)ethyl 4-(p-chlorophenyl)thiolbutyrate, 1-(diethoxyphosphinyl)propyl thiolcinnamate, etc.

The present phosphinyl-substituted esters of thiol carboxylic acids are stable, generally liquid, materials ranging from thin fluids to highly viscous oils. They are useful for a wide variety of agricultural and chemical purposes. Thus, e. g., the esters of organic thiolcarboxylic acids of the present formula may be used to modify the viscosity, oxidizing or other properties of oils and gasoline, or may be added to rubber to improve the physical and chemical characteristics thereof, or may be used as modifiers for polymerizations such as the emulsion polymerization of butadiene with styrene and similar monomers, etc. The present novel compounds derived from organic carboxylic acids containing from one to ten carbon atoms are also particularly valuable as biological toxicants, being especially useful as soil fumigants, nematocides, fungicides, herbicides, bactericides, and particularly, insecticides. For application to eradicate insect blight, for example, these compounds may be dispersed or emulsified in an aqueous system, using conventional emulsifying agents such as higher-alkylbenzenesulfonates, with or without the use of a water-immiscible solvent, to produce a sprayable composition containing, e. g., about 1% or less of active ingredient. Alternatively, the present compounds may be formulated for application as dusts by mixing the active toxic chemical with a powdered carrier such as talc, pumice, etc.

In the preparation of the present phosphono-substituted hydrocarbon esters of organic thiolcarboxylic acids, the mercapto-substituted hydrocarbonphosphonate ester is simply contacted with the organic carboxylic acid halide or anhydride until formation of the thiolcarboxylic acid ester has occurred. Depending on the individual reactants employed and the quantities used, heating or cooling of the mixture may be required. In many cases, formation of the product takes place spontaneously and evolution of heat may occur. It is often advantageous to keep the reaction temperature low, by external cooling, to moderate the reaction until the addition of reactants is complete; after this, the temperature of the reaction mixture may be raised to room temperature or above to drive the reaction as far towards completion as possible. In order to dissipate reaction heat, it may also be desirable to work in the presence of inert solvents or diluents. Such solvents may be, e. g., benzene, cyclohexane, ether, kerosene, etc. Since acid is generated in the reaction, it is generally advisable to add a basic material to the reaction mixture to control the pH thereof. Typical useful basic materials for this purpose are inorganic bases, such as sodium hydroxide, sodium bicarbonate, sodium carbonate, etc., and organic bases such as pyridine, quinoline, etc. The reaction may be effected, if desired, at increased or diminished pressure, or in the presence of a condensation catalyst; however, the ease of the reaction at ordinary atmospheric pressure and in the absence of catalysts generally requires no control of the reaction by pressure variation or acceleration thereof by catalytic means.

The invention is further illustrated, but not limited, by the following examples:

Example 1

A 500 ml., four-necked flask provided with a stirrer, thermometer, condenser, and dropping funnel and containing 100 ml. of benzene and 18.5 g. (0.134 mole) of potassium carbonate was cooled to 5° C., after which 13.3 g. (0.067 mole) of diethyl 1-mercaptoethylphosphonate was added to the contents of the flask. Then p-chlorobenzoyl chloride (11.7 g., 0.067 mole) was added slowly to the reaction mixture, held at 5 to 8° C., over a period of 0.2 hour. After the addition was complete, the reaction mixture was left standing overnight at room temperature and then concentrated to a pot temperature of 97° C./0.2 mm., giving 22 g. (98% theor. yield) of colorless, liquid, 1-(diethoxyphosphinyl)ethyl p-chlorothiolbenzoate, $n_D^{25}$ 1.5329, analyzing as follows:

|  | Found | Calcd. for $C_{13}H_{18}ClO_4PS$ |
|---|---|---|
| Percent C | 45.95 | 46.4 |
| Percent H | 5.65 | 5.4 |
| Percent Cl | 10.31 | 10.5 |
| Percent P | 9.18 | 9.2 |

This (dialkoxyphosphinyl)alkyl chlorothiolaryl carboxylic acid ester inhibits the growth of the fungus species *Aspergillus niger* at a concentration of 0.1%. It is also toxic on contact to insects such as *Oncopeltus fasciatus* and *Tetranychus bimaculatus*; applied to plants in non-phytotoxic concentration, it is transmitted systemically and exerts a toxic effect on insects feeding on plant foliage, such as *Prodenia eridania* larvae and *Aphis gossypii*.

Example 2

To a solution of 15.8 g. (0.05 mole) of dibutyl α-mercaptobenzylphosphonate and 10.2 g. (0.1 mole) of acetic anhydride in 50 ml. of benzene were added 2.0 g. of sodium acetate. Exothermal reaction occurred. The reaction mixture was then refluxed for an hour, cooled, filtered, concentrated under vacuum, again filtered, and finally concentrated to a pot temperature of 80° C./0.2 mm. The 17.6 g. of liquid product was again filtered, to yield clear, colorless, liquid α-(dibutoxyphosphinyl)-benzyl thiolacetate, $n_D^{25}$ 1.5012.

Similarly, by the reaction of bis(2-chloroethyl) 2-mercaptoethylphosphonate with 2-methyl-4-chlorophenoxyacetyl chloride, there is produced 2-[bis(2-chloroethoxy)phosphinyl]ethyl (2-methyl-4-chlorophenoxy)-thiolacetate.

Although the invention has been described with reference to certain specific embodiments thereof, it is to be understood that various modifications and adaptations of the arrangements herein disclosed may be made as readily occur to persons skilled in the art, without constituting a departure from the spirit and scope of the invention as defined in the objects and in the appended claims.

What is claimed is:

1. Phosphono-substituted hydrocarbon esters of organic thiolcarboxylic acids wherein the said hydrocarbon ester group contains from one to ten carbon atoms, is free of non-benzenoid unsaturation, and separates the phosphorus and sulfur atoms of the said esters by from one to five aliphatic carbon atoms, wherein the phosphono group is esterified by radicals selected from the class consisting of lower-alkyl and halo-lower-alkyl radicals, and wherein the organic radical directly attached by a carbon atom to the carbonyl carbon atom of said thiolcarboxylic acid contains 1 to 20 carbon atoms, is free of non-benzenoid unsaturation, and is selected from the class consisting of hydrocarbon and halo-substituted hydrocarbon radicals.

2. [Di(halo - lower - alkoxy)phosphinyl]hydrocarbon esters of organic thiolcarboxylic acids, wherein the said hydrocarbon ester group contains from one to ten carbon atoms, is free of non-benzenoid unsaturation, and separates the phosphorus and sulfur atoms of the said esters by from one to five aliphatic carbon atoms, and wherein the organic radical directly attached by a carbon atom to the carbonyl carbon atom of the said thiolcarboxylic acid radical contains from one to twenty carbon atoms, is free of non-benzenoid unsaturation, and is selected from the class consisting of hydrocarbon radicals and halo-substituted hydrocarbon radicals.

3. [Di-(lower-alkoxy)phosphinyl]hydrocarbon esters of organic thiolcarboxylic acids, wherein the said hydrocarbon ester group contains from one to ten carbon atoms, is free of nonbenzenoid unsaturation, and separates the phosphorus and sulfur atoms of the said esters by a chain of from one to five aliphatic carbon atoms, and wherein the organic radical directly attached by a carbon atom to the carbonyl carbon atom of the said thiolcarboxylic acid radical contains from one to twenty carbon atoms, is free of non-benzenoid unsaturation, and is selected from the class consisting of hydrocarbon radicals and halo-substituted hydrocarbon radicals.

4. 1-[Di-(lower-alkoxy)phosphinyl]hydrocarbon esters of organic thiolcarboxylic acids, wherein the said hydrocarbon radical contains from one to ten carbon atoms, is free of non-benzenoid unsaturation, and separates the phosphorus and sulfur atoms of the said esters by a chain of from one to five aliphatic carbon atoms, and wherein the organic radical of the said organic thiolcarboxylic acid which is directly attached by a carbon atom to the carbonyl carbon atom of the thiolcarboxylic radical contains from one to twenty carbon atoms, is free of non-benzenoid unsaturation, and is selected from the class consisting of hydrocarbon radicals and halo-substituted hydrocarbon radicals.

5. 1-(diethoxyphosphinyl)ethyl p-chlorothiolbenzoate.

6. α-(dibutoxyphosphinyl)benzyl thiolacetate.

7. 2-[bis(2-chloroethoxy)phosphinyl]ethyl (2-methyl-4-chlorophenoxy)thiolacetate.

8. The process which comprises contacting an organic carboxylic acid derivative selected from the class consisting of organic carboxylic acid halides and organic carboxylic acid anhydrides with a mercapto-hydrocarbonphosphonate ester of the formula $HS-R'-PO(OR)_2$ where R is selected from the class consisting of lower-alkyl and halo-lower-alkyl radicals and R′ is a hydrocarbon radical of from one to ten carbon atoms, free of non-benzenoid unsaturation, separating the phosphorus and sulfur atoms of the said ester by from one to five aliphatic carbon atoms, and isolating from the resulting reaction product a compound of the formula

where R′ and R have the meaning described above, and R″ which represents the radical attached by carbon to the carbonyl atom of the acid function of said organic carboxylic acid derivative is free of non-benzenoid unsaturation, contains from 1 to 20 carbon atoms, and is selected from the class consisting of hydrocarbon and halo-substituted hydrocarbon radicals.

9. The process which comprises contacting an organic carboxylic acid derivative of the formula

where

represents the radical obtained by removal of the OH radical from an organic carboxylic acid, R'' is an organic radical directly attached by a carbon atom to the carbonyl carbon atom of

contains from one to twenty carbon atoms, is free of non-benzenoid unsaturation, and is selected from the class consisting of hydrocarbon radicals and halo-substituted hydrocarbon radicals, and X taken separately represents halogen, while X taken together with

represents a carboxylic acid anhydride, with a mercapto-substituted hydrocarbonphosphonate ester of the formula HS—R'—PO(OR)$_2$ where R represents a halo-lower-alkyl radical and R' represents a hydrocarbon radical of from one to ten carbon atoms, free of nonbenzenoid unsaturation, separating the phosphorus and sulfur atoms by from one to five aliphatic carbon atoms, and isolating from the resulting reaction product a compound of the formula

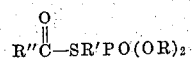

where R'', R', and R have the meaning described hereinabove.

10. The process which comprises contacting an organic carboxylic acid derivative of the formula

where

represents the radical obtained by removal of the OH radical from an organic carboxylic acid, R'' is an organic radical directly attached by a carbon atom to the carbonyl carbon atom of

contains from one to twenty carbon atoms, is free of non-benzenoid unsaturation, and is selected from the class consisting of hydrocarbon radicals and halo-substituted hydrocarbon radicals, and X taken separately represents halogen, while X taken together with

represents a carboxylic acid anhydride, with a mercapto-substituted hydrocarbonphosphonate di-lower-alkyl ester of the formula HS—R'—PO(OR)$_2$ where R represents a lower-alkyl radical and R' represents a hydrocarbon radical of from one to ten carbon atoms, free of non-benzenoid unsaturation, separating the phosphorus and sulfur atoms by from one to five aliphatic carbon atoms, and isolating from the resulting reaction product a compound of the formula

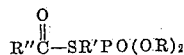

where R'', R', and R have the meaning described hereinabove.

11. The process which comprises contacting a di-lower-alkyl ester of a 1-mercapto phosphonic acid of the formula

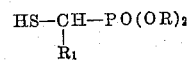

where R represents a lower alkyl radical and R$_1$ represents a hydrocarbon radical of from one to nine carbon atoms and free of non-benzenoid unsaturation, with an organic carboxylic acid derivative of the formula

where

represents the radical obtained by removal of the OH radical from an organic carboxylic acid, R'' is an organic radical directly attached by a carbon atom to the carbonyl carbon atom of

contains from one to twenty carbon atoms, is free of non-benzenoid unsaturation, and is selected from the class consisting of hydrocarbon radicals and halo-substituted hydrocarbon radicals, and X taken separately represents halogen, while X taken together with

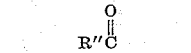

represents a carboxylic acid anhydride, and isolating from the resulting reaction product a compound of the formula

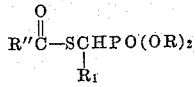

where R'', R$_1$, and R have the meaning described hereinabove.

12. The process which comprises contacting bis(2-chloroethyl) 2 - mercaptoethylphosphonate with (2-methyl-4-chlorophenoxyl)-acetyl chloride and isolating from the resulting reaction product 2-[bis(2-chloroethoxy)phosphinyl]ethyl (2 - methyl-4-chlorophenoxy)-thiolacetate.

13. The process which comprises contacting dibutyl α-mercaptobenzylphosphonate with acetic anhydride and isolating from the resulting reaction product α-(dibutoxyphosphinyl)benzyl thiolacetate.

14. The process which comprises contacting diethyl 1-mercaptoethylphosphonate with p-chlorobenzoyl chloride and isolating from the resulting reaction product 1-(diethoxyphosphinyl)ethyl p-chlorothiolbenzoate.

References Cited in the file of this patent

UNITED STATES PATENTS

| | | |
|---|---|---|
| 2,597,534 | Schrader | May 20, 1952 |
| 2,640,847 | Schrader | June 2, 1953 |
| 2,690,450 | Gilbert et al. | Sept. 28, 1954 |

OTHER REFERENCES

Wertheim: Textbook of Organic Chemistry, McGraw-Hill Book Co., New York, 1951, p. 133.

Pudouik et al.: Chemical Abstracts, vol. 47 (p. 10463), 1953.

Wagner et al.: "Synthetic Organic Chemistry," Md. Ed., 1953, pp. 481-3.